(No Model.) 3 Sheets—Sheet 1.
J. F. LANING.
INDEX.

No. 493,552. Patented Mar. 14, 1893.

Witnesses.
F. H. Moon
Kitty Mauney

Inventor
Jay. F. Laning
by Wm Moon
Attorney (No Model.)

3 Sheets—Sheet 2.

J. F. LANING.
INDEX.

No. 493,552. Patented Mar. 14, 1893.

*Fig. 4.*

(No Model.)　　　　　　　　　　　　　　　　　　　　3 Sheets—Sheet 3.

J. F. LANING.
INDEX.

No. 493,552.　　　　　　　　　　　　　Patented Mar. 14, 1893.

*Fig. 5.*

[Railroad timetable for Michigan Central Railroad, showing schedules for Detroit & Bay City Div., Detroit & Toledo Div., Air Line Division, Michigan Midland Division, and North Midland Division, dated Nov. 15, '91—C.T.]

All light figures A. M.　　All dark figures P. M.　　Read Table of Explanations on Index Page.

Witnesses　　　　　　　　　　　　　　　　　　Inventor
F. N. Moore　　　　　　　　　　　　　　　　　Jay F. Laning
Kitty Haney　　　　　　　　　　　　　　　　by Wm. M. Hoover
　　　　　　　　　　　　　　　　　　　　　　　Attorney

UNITED STATES PATENT OFFICE.

JAY FORD LANING, OF NORWALK, OHIO.

INDEX.

SPECIFICATION forming part of Letters Patent No. 493,552, dated March 14, 1893.

Application filed February 11, 1892. Serial No. 421,207. (No model.)

*To all whom it may concern:*

Be it known that I, JAY FORD LANING, a citizen of the United States, residing at Norwalk, in the county of Huron and State of Ohio, have invented certain new and useful Improvements in Indices; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in indices and it is adapted to a large variety of uses in all publications where an index must be used to make the subject matter accessible without unnecessary waste of time, as in dictionaries, lexicons, bound indices to voluminous public reports, railroad guides, and in innumerable other situations.

My invention consists of a complete, general and special index arranged on every page of a book, and it comprises an alphabetical arrangement of the first letters or characters of subject matter as one complete index in combination with a secondary index containing matter under the general subject with the additional characters following thereupon arranged alphabetically as before.

Figure 1:
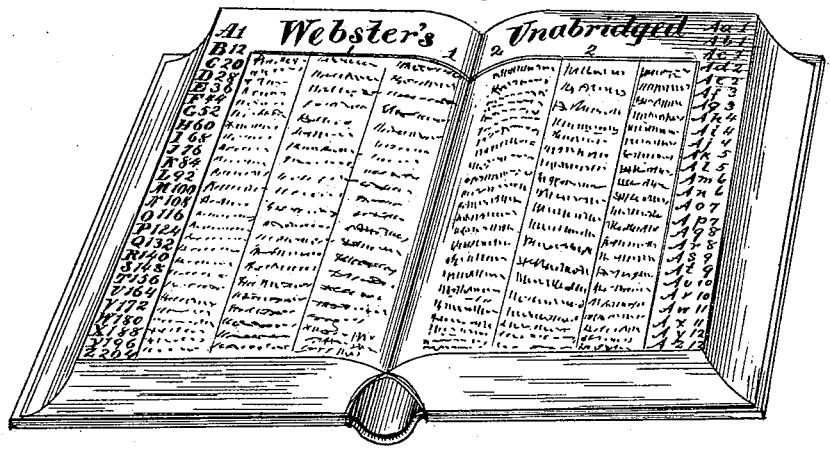
Figure 2:
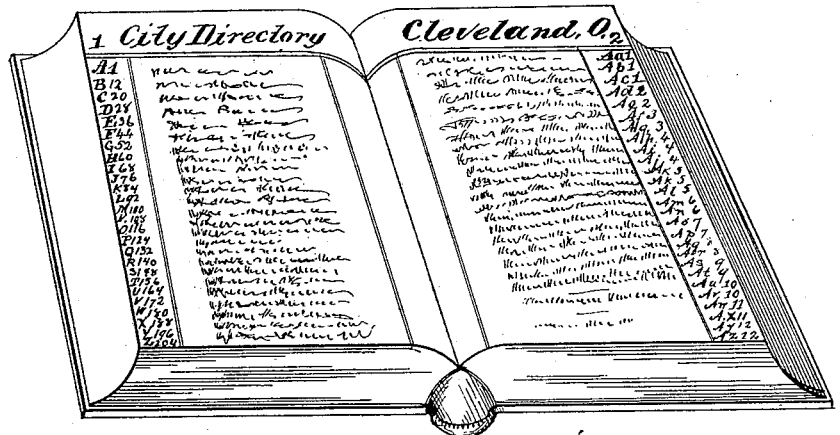
Figure 3:
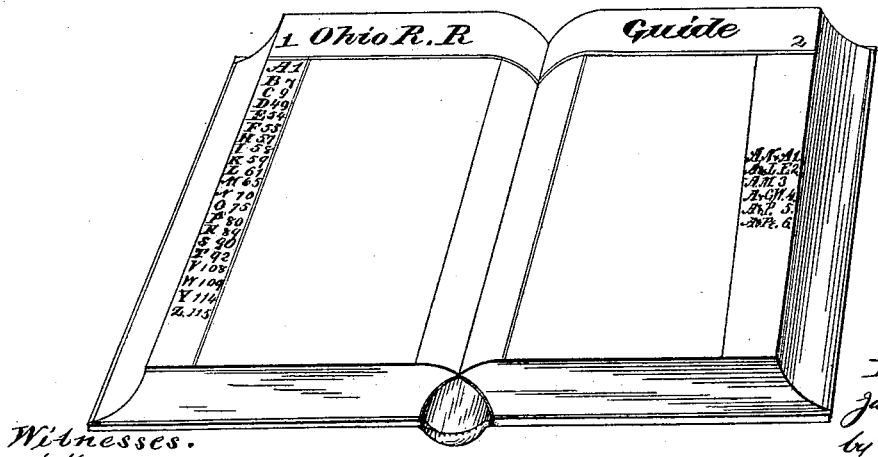
Figure 4:
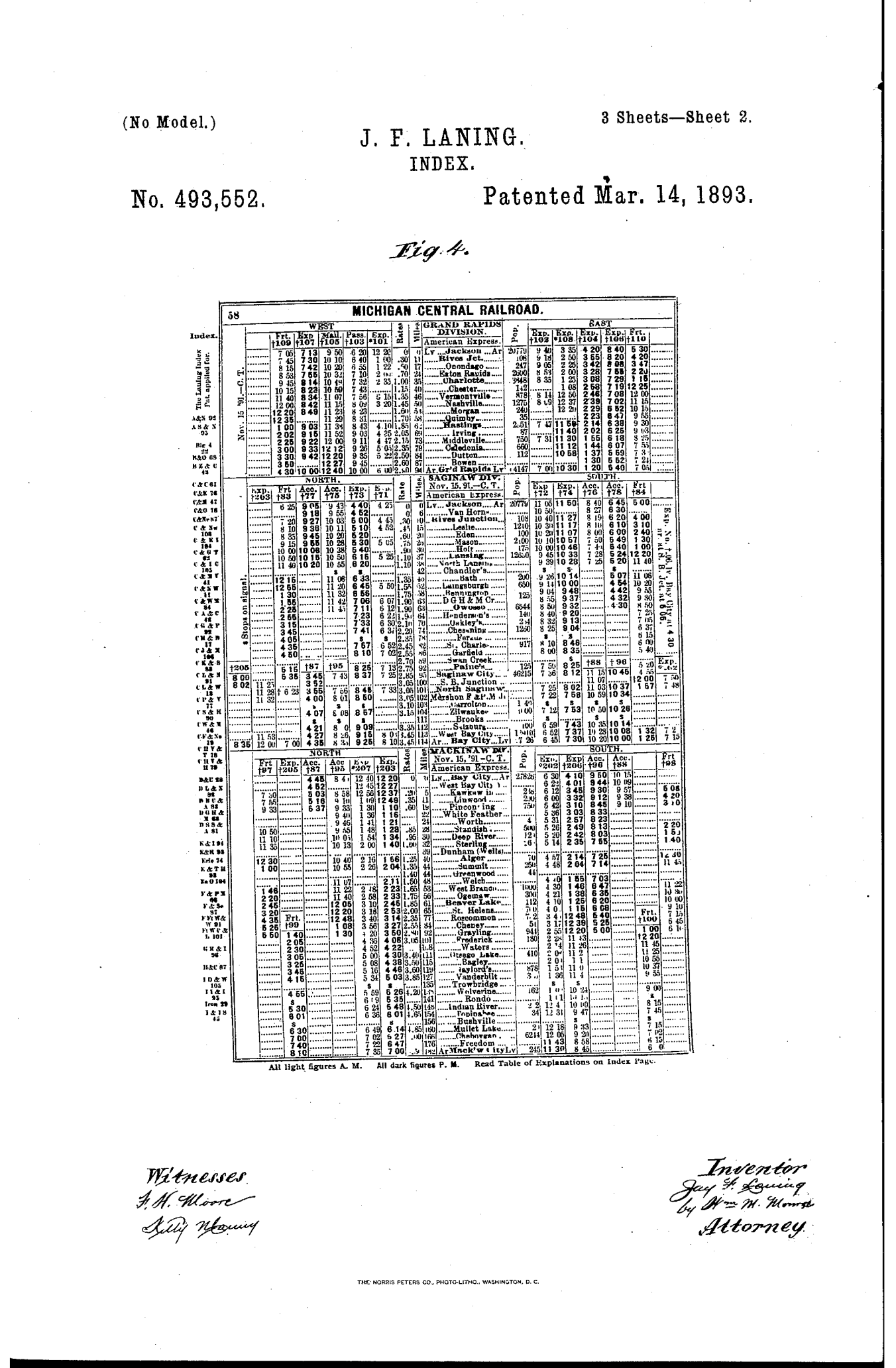

In the drawings, Figure 1 is a view of a page of a dictionary showing the invention as applied thereto. Fig. 2 is a view of a business directory suitably arranged, and Fig. 3 of a railroad guide. Figs. 4 and 5 are two pages taken at random from a printed guide showing complete index at a single opening.

It will be seen that the usual alphabetical index is printed upon one column or margin of each page throughout the book, and cover, each letter being followed by the numeral of the page upon which it is first introduced, as $A'$, $B^8$, $C^{12}$, $D^{16}$, &c., throughout the book, and on cover, if desired, the necessity of repetition being found in the fact that wherever the book is opened, the page required for the desired letter may be found at once. Since, however, in lexicons and dictionaries which are very full in words or phrases one letter may include a large number of words or phrases, an additional index is required to locate the exact page, a second column is added giving the leading letter or character required with the additional first following letters or characters in alphabetical order, as $Aa'$, $Ab^2$, $Ac^4$, $Ad^5$, $Ae^6$, &c., throughout the alphabet, so that the exact number of page desired will appear at a glance to the eye at whatever page the book is opened.

In case the full alphabet is too long to be clearly printed upon one column of a page or one half may be placed on each page shown at an opening, one page may be utilized to show the general plan, and the more specific location may be given upon the next page using both columns if necessary, or two columns may be given upon one page, or the cover. In city directories the same plan may be observed to advantage, the usual special headings of societies, cemeteries, street directory, &c., being entered under the general heading following the alphabet and a specific heading used with each of these heads.

This invention will be found to be of the greatest advantage in railway guides. In this case the second letters being initial letters or abbreviations, as A. & G. W. 2, for Atlantic and Great Western, page 2; B. & O. 30, for Baltimore and Ohio, page 30, the same facility being given as in other cases for instantly finding the page giving the time table of each road.

It will be observed that in a railway guide the titles of the general divisions are printed in full, longitudinally across the pages containing the said matter, and the titles to the sub-divisions are printed adjacent thereto, in full, and that the subject matter to these divisions as the names of stations, are printed in full in central vertical lines.

Other records for auditors, time keepers, or for county or city purposes can be indexed in this manner with accessibility and economy of time hitherto unknown in the art. It will be seen that no injury will be done the volume, nor any clipping or pasting be required. The clearest type compatible with the size of volume should be used.

An additional instance of the use to which such an index can be put will be found in large commercial reports in which the names are arranged alphabetically under each State. By this device a general index by the abbreviation of the names of States, can be put on one page at each opening, and a secondary index to the names of individuals placed upon the opposite page. An adaptation of this principle to a Bible is also seen, since the abbreviated name of a book, as Mat., Mark, &c., may be placed on one margin, and on the second margin the chapter and page. The top and bottom margins may be used in lieu of side columns.

I do not claim as my invention a mere alphabetical index, or any particular style of printing or lettering, but

What I claim as new, and desire to secure by Letters Patent, is—

In combination with the regular printed leaves of a book, a combined general and specific index arranged in vertical columns on every page of the book, the general index being printed in a vertical column on one side margin of every page of a book, the said index comprising the first letter, character or abbreviation of the general subject-matter of the book, arranged in a vertical column as each general subject occurs in the book and said letter, abbreviation or character having placed after it in a horizontal line the numeral of the page where the general subject matter first appears in the book; and the specific index printed in a vertical column on the opposite side margin of every page in the book, the said specific index comprising the first letter, character or abbreviation of a general subject matter of the book arranged in a vertical column and said letter, abbreviation or character having placed after it in a horizontal line the adjoining letter, character or abbreviation representing the second letter in a word or a specific heading under a general subject matter, and this latter letter, abbreviation or character having printed after it in a horizontal line the numeral of the page upon which the specific subject matter is found, substantially as described.

JAY FORD LANING.

Witnesses:
  WM. M. MONROE,
  ALBERT SHELDON.